(12) United States Patent
Sonobata (10) Patent No.: US 7,018,312 B2
(45) Date of Patent: *Mar. 28, 2006

(54) CHAIN TENSIONER

(75) Inventor: Akira Sonobata, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 191 days.

This patent is subject to a terminal disclaimer.

(21) Appl. No.: 10/646,744

(22) Filed: Aug. 25, 2003

(65) Prior Publication Data

US 2004/0106484 A1 Jun. 3, 2004

(30) Foreign Application Priority Data

Sep. 11, 2002 (JP) .............................. 2002-265193

(51) Int. Cl.
*F16H 7/08* (2006.01)

(52) U.S. Cl. ........................................ 474/111; 474/140
(58) Field of Classification Search ................ 474/111, 474/140
See application file for complete search history.

(56) References Cited

U.S. PATENT DOCUMENTS 6,612,952 B1* 9/2003 Simpson et al. ............ 474/111

2002/0061799 A1 5/2002 Young
2004/0132569 A1* 7/2004 Fujikubo et al. ............ 474/111
2004/0214672 A1* 10/2004 Thomas et al. ............. 474/111

FOREIGN PATENT DOCUMENTS

| JP | 2-296046 A | 12/1990 |
| JP | 7-151197 A | 6/1995 |
| JP | 2000097300 | 4/2000 |
| JP | 2001227605 | 8/2001 |

* cited by examiner

*Primary Examiner*—Vicky A. Johnson
(74) *Attorney, Agent, or Firm*—Birch, Stewart, Kolasch & Birch,LLP (57) ABSTRACT

To enable the simultaneous achievement of the enhancement of an oscillation absorption function of a tensioner arm for a transmission chain and the enhancement of wear resistance in a chain tensioner. A tensioner arm is composed of an elastic band tensioner arm body curved toward a transmission chain and a flexible tensioner shoe which covers the front of the tensioner arm body and which is provided with a chain guide groove to the front of which the transmission chain is slidably fitted. The width of the middle in the longitudinal direction of the tensioner arm body is set so that the width is smaller than the width of each end of the arm body.

20 Claims, 10 Drawing Sheets

CHAIN TENSIONER

CROSS-REFERENCE TO RELATED APPLICATIONS

The present application claims priority under 35 USC 119 to Japanese Patent Application No. 2002-265193 filed on Sep. 11, 2002 the entire contents thereof are hereby incorporated by reference.

BACKGROUND OF THE INVENTION

1. Field of the Invention

The present invention relates to a chain tensioner provided with a tensioner arm rockably supported by a fixed structure and relatively slidably engaged with the outside on the loose side of a transmission chain without an end coupling a driving sprocket and a driven sprocket and a tensioner lifter supported by fixed structure for pressing the tensioner arm upon the side of the transmission chain. More particularly, the invention relates to the improvement of a chain tensioner the tensioner arm which is formed by a band elastic member curved toward the transmission chain.

2. Description of Background Art

In such a chain tensioner, it is already well-known as disclosed in Japanese Published Unexamined Patent Application No. Hei2-296046, for example, that a tensioner arm is formed by a band elastic member curved toward a transmission chain.

In Japanese Published Unexamined Patent Application No. Hei7-151197, a chain tensioner is provided in which the width of the middle of a tensioner arm is set to a smaller value than the width of each end. The tensioner arm is rigid and in addition, the middle is directly slidingly engaged with a transmission chain, the chain tensioner is not an object of the invention.

A chain tensioner in which a tensioner arm is formed by a band elastic member curved toward a transmission chain has an advantage wherein the oscillation of the transmission chain can be absorbed by the deflection of the tensioner arm. However, as in a conventional tensioner, the tensioner arm is directly slidingly engaged with the transmission chain. Thus, a problem occurs wherein the surface pressure between the tensioner arm and the transmission chain increases and the wear resistance of the tensioner arm is deteriorated when it is attempted to narrow the width of the middle of the tensioner arm, to enhance the flexibility of the middle and to enhance the oscillation absorption function for the transmission chain.

SUMMARY AND OBJECTS OF THE INVENTION

The invention is made in view of such a problem and an object is to provide a chain tensioner in which the enhancement of an oscillation absorption function for a transmission chain of a tensioner arm and the enhancement of wear resistance can be simultaneously achieved.

To achieve this object, the present invention is based upon a chain tensioner provided with a tensioner arm rockably supported by a fixed structure and relatively slidably engaged with the outside on the loose side of a transmission chain without an end coupling a driving sprocket and a driven sprocket and a tensioner lifter supported by a fixed structure for pressing the end of the tensioner arm upon the side of the transmission chain. The tensioner arm is composed of an elastic band tensioner arm body curved toward the transmission chain and a flexible tensioner shoe that covers the front of the tensioner arm body and is provided with a chain guide groove to the front of which the transmission chain is slidably fitted and the width of the middle in the longitudinal direction of the tensioner arm body is set to a smaller value than the width of each end of the arm body.

The fixed structure corresponds to an engine body Ea in embodiments described later with respect to the present invention.

According to the present invention, as the flexibility of the middle of the tensioner arm body is enhanced, an oscillation absorption function for the transmission chain can be enhanced and the width of the tensioner arm body is different in each part, the natural frequency of the tensioner arm body is different in each part and the resonance of the tensioner arm body can be also prevented.

In addition, in a location in which the width of the tensioner arm body is small, as the tensioner shoe is provided with the chain guide groove to which the transmission chain is fitted though surface pressure between the tensioner arm body and the tensioner shoe being large, surface pressure between the tensioner shoe and the transmission chain is not particularly large and the durability of the tensioner arm can be secured without damaging the wear resistance of the tensioner shoe.

The present invention provides an arc-shaped cut-out formed on both sides of the middle to set the width of the middle of the tensioner arm body to a small value.

According to the present invention, desired flexibility can be simply applied to the middle of the tensioner arm body by selecting the depth and the number of cut-outs.

Further, the present invention is based upon a chain tensioner provided with a tensioner arm rockably supported by a fixed structure and relatively slidably engaged with the outside on the loose side of a transmission chain without an end coupling a driving sprocket and a driven sprocket and a tensioner lifter supported by a fixed structure for pressing the end of the tensioner arm upon the side of the transmission chain. The tensioner arm is composed of a band elastic tensioner arm body curved toward the transmission chain and a flexible tensioner shoe that covers the front of the tensioner arm body and is provided with a chain guide groove to the front of which the transmission chain is slidably fitted with a hole provided in the middle in the longitudinal direction of the tensioner arm body.

According to the present invention, the flexibility of the middle of the tensioner arm body is enhanced, an oscillation absorption function for the transmission chain can be enhanced, the natural frequency is different in a part with the hole and a part without the hole in the tensioner arm body and the resonance of the tensioner arm body can be also prevented.

In addition, in the periphery of the hole of the tensioner arm body, surface pressure between the tensioner shoe and the transmission chain is not particularly large because the tensioner shoe which is provided with the chain guide groove to which the transmission chain is fitted though surface pressure between the tensioner arm body and the tensioner shoe is large and the durability of the tensioner arm can be secured without damaging the wear resistance of the tensioner shoe.

Besides, desired flexibility can be simply applied to the middle of the tensioner arm body by selecting the shape and the number of the holes.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Suitable embodiments of the present invention shown in the drawings will be described below.

Figure 1:
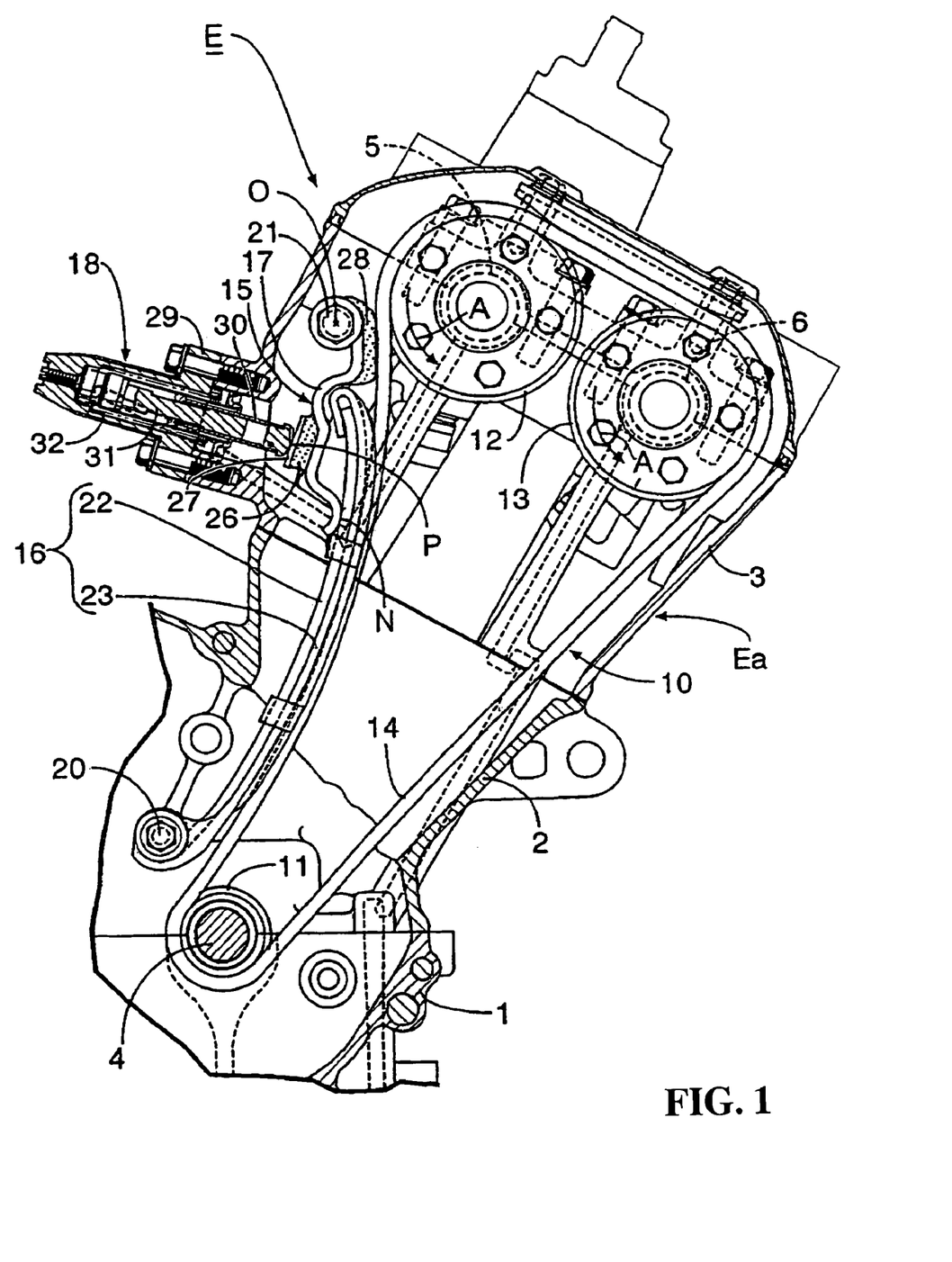
FIG. 1 is a side view showing a timing transmission gear for a valve gear of an engine provided with a chain tensioner according to the present invention.
Figure 2:
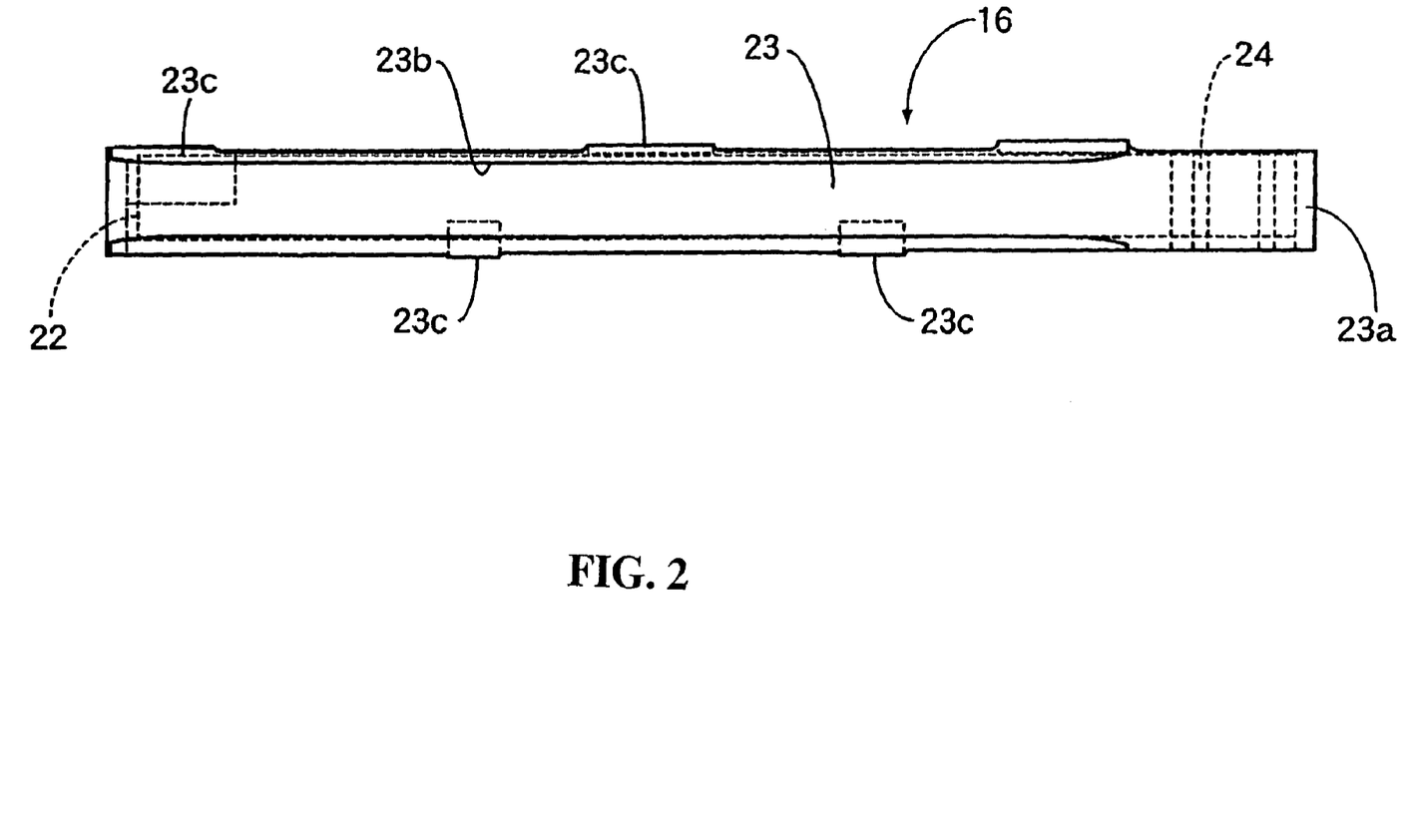
FIG. 2 is a plan showing a tensioner arm of the chain tensioner.
Figure 3:
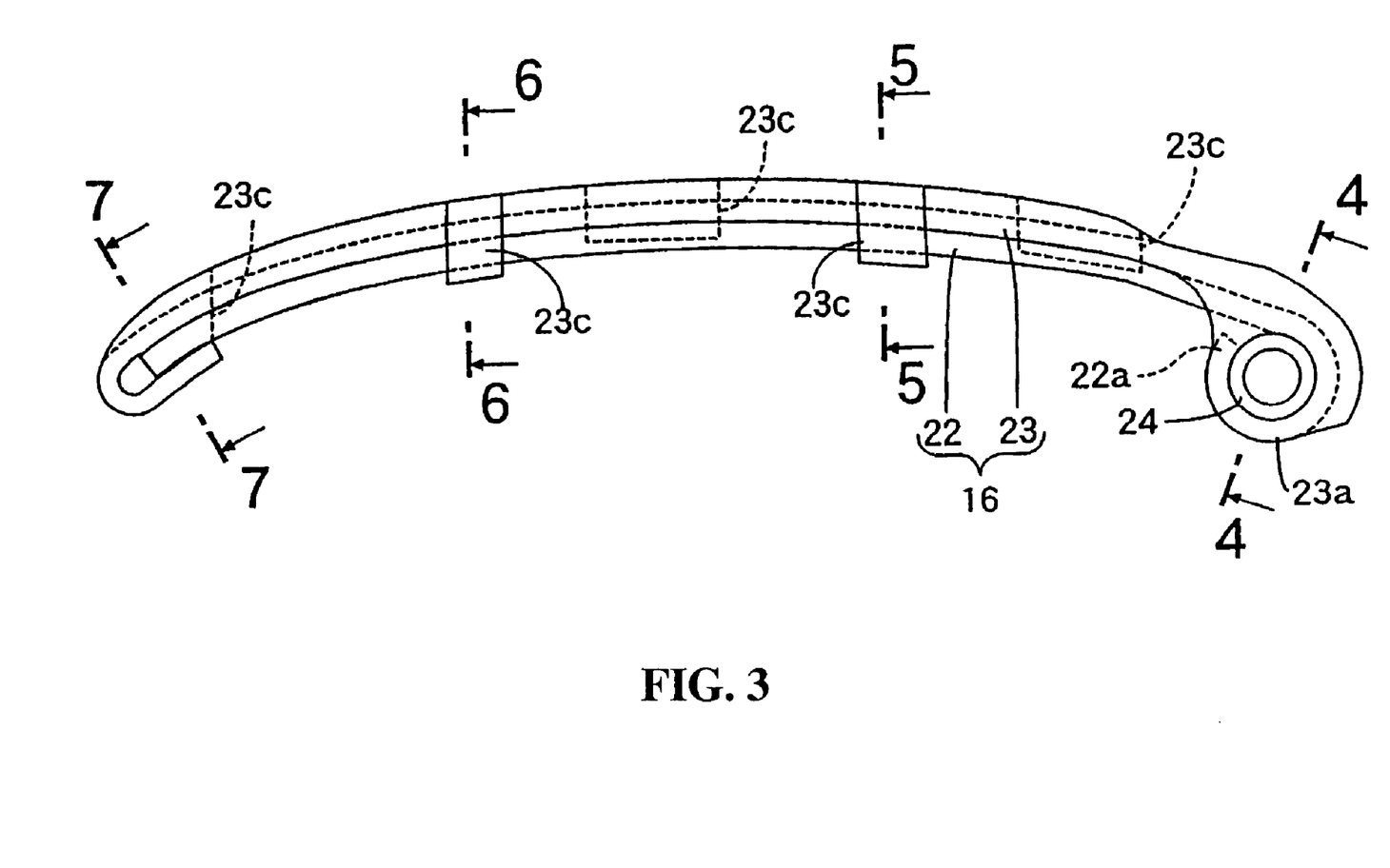
FIG. 3 is a side view showing the tensioner arm.
Figure 4:
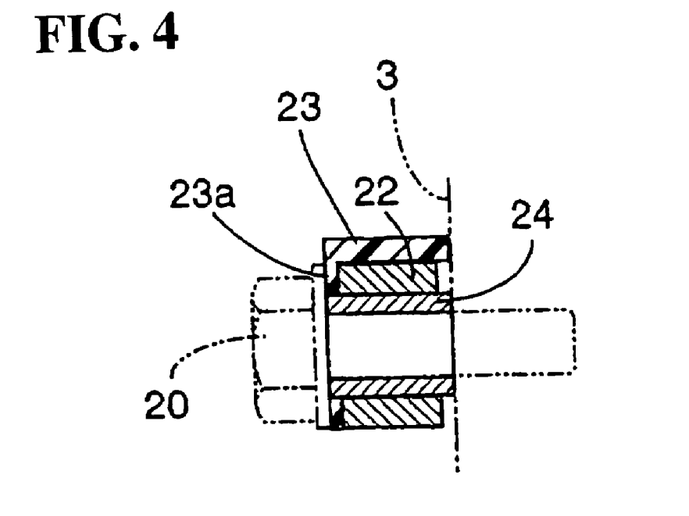
FIG. 4 is a sectional view viewed along a line 4—4 in FIG. 3.
Figure 5:
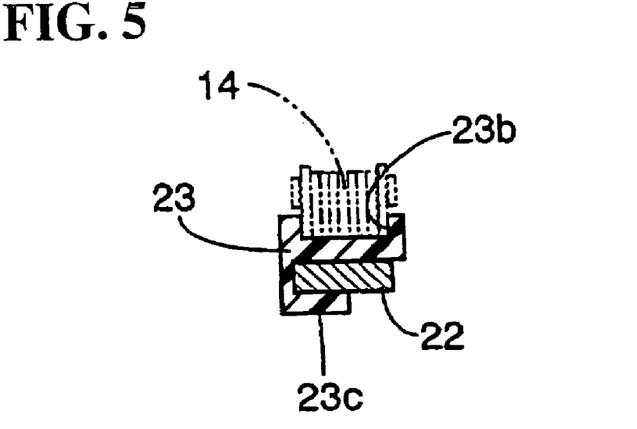
FIG. 5 is a sectional view viewed along a line 5—5 in FIG. 3.
Figure 6:
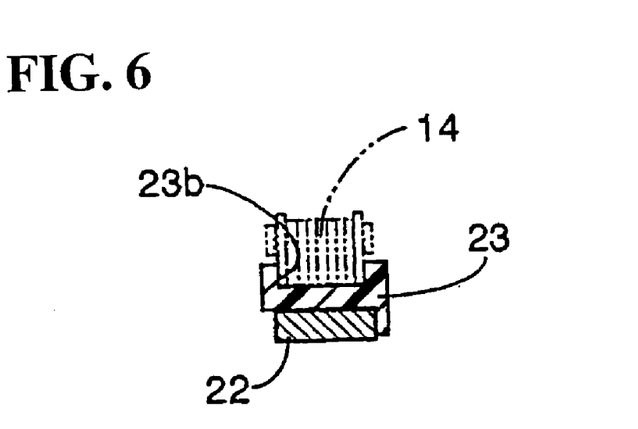
FIG. 6 is a sectional view viewed along a line 6—6 in FIG. 3.
Figure 7:
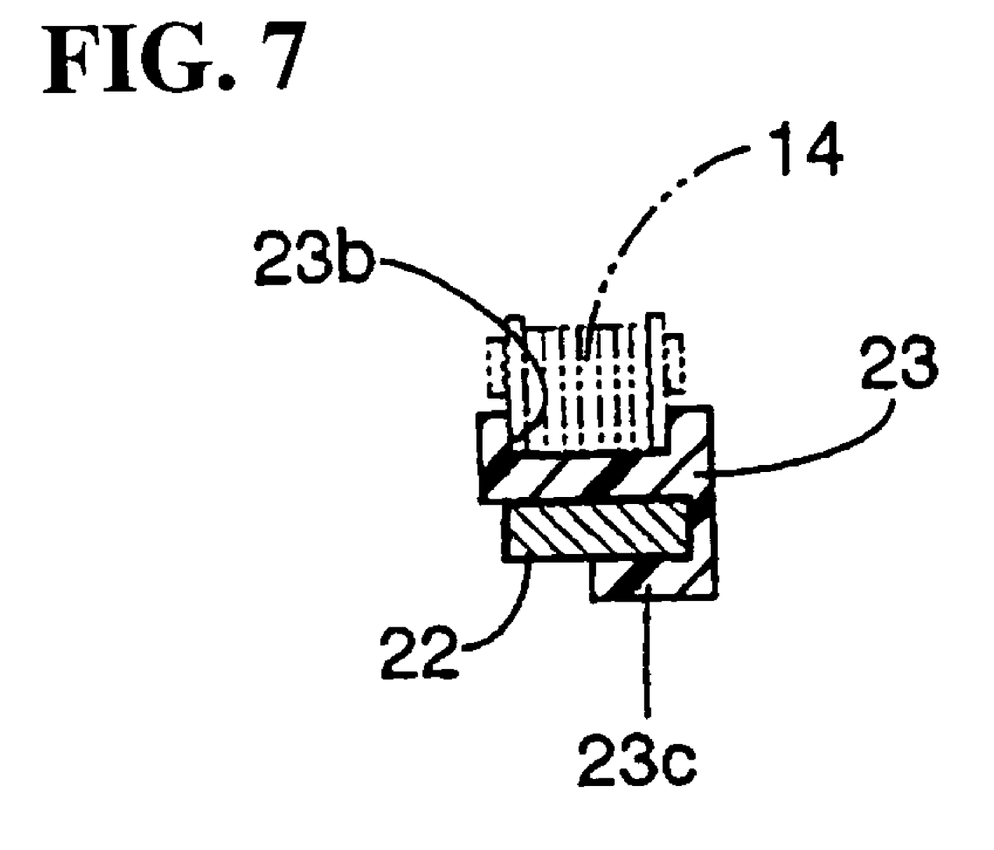
FIG. 7 is a sectional view viewed along a line 7—7 in FIG. 3.

First, as shown in FIG. 1, an engine E for a motorcycle is arranged in a state in which the head is inclined in front of a vehicle. The body Ea of the engine E is composed of a crankcase 1, a cylinder block 2 and a cylinder head 3, a crankshaft 4 is supported by the crankcase 1, a camshaft for intake air 5 and a camshaft for exhaust 6 are supported by the cylinder head 3, and the crankshaft 4, the camshaft for intake air 5 and the camshaft for exhaust 6 are coupled by a timing transmission gear 10.

The timing transmission gear 10 is composed of a driving sprocket 11 fixed to the crankshaft 4, first and second driven sprockets 12, 13, respectively, are fixed to the camshaft for intake air 5. The camshaft for exhaust 6 and a transmission chain 14, without an end wound on the driving sprocket 11, is fixed to the first and second driven sprockets 12, 13. The first and second driven sprockets 12, 13 both have double teeth corresponding to the number of the teeth of the driving sprocket 11 and are driven in a direction shown by an arrow A at a half reduction ratio from the driving sprocket 11.

On the loose side of the transmission chain 14, a chain tensioner 15 according to the invention for applying fixed tension to it is arranged.

The chain tensioner 15 is composed of a tensioner arm 16, a control arm 17 and a tensioner lifter 18.

As shown in FIGS. 1 to 7, the tensioner arm 16 is composed of a band tensioner arm body 22 rockably supported in the vicinity of the driving sprocket 11 via a first pivot 20 by the cylinder block 2. The tensioner arm 16 is made of a spring steel plate curved toward the outside of the loose side of the transmission chain 14 and a flexible tensioner shoe 23 made of synthetic resin that covers the front of the tensioner arm body 22 and is slidingly engaged with the outside of the loose side of the transmission chain 14. The tensioner arm body 22 and the tensioner shoe 23 are respectively provided with a boss 22a and a boss 23a supported via a collar 24 by the first pivot 20 at each end. A chain guide groove 23b is provided to which the loose side of the transmission chain 14 is fitted so that the loose side that can be slid is formed on the front of the tensioner shoe 23 and at the back of the tensioner shoe. Plural holding claws 23c are formed for holding the tensioner arm body 22 lapped over the tensioner shoe.

Figure 8:
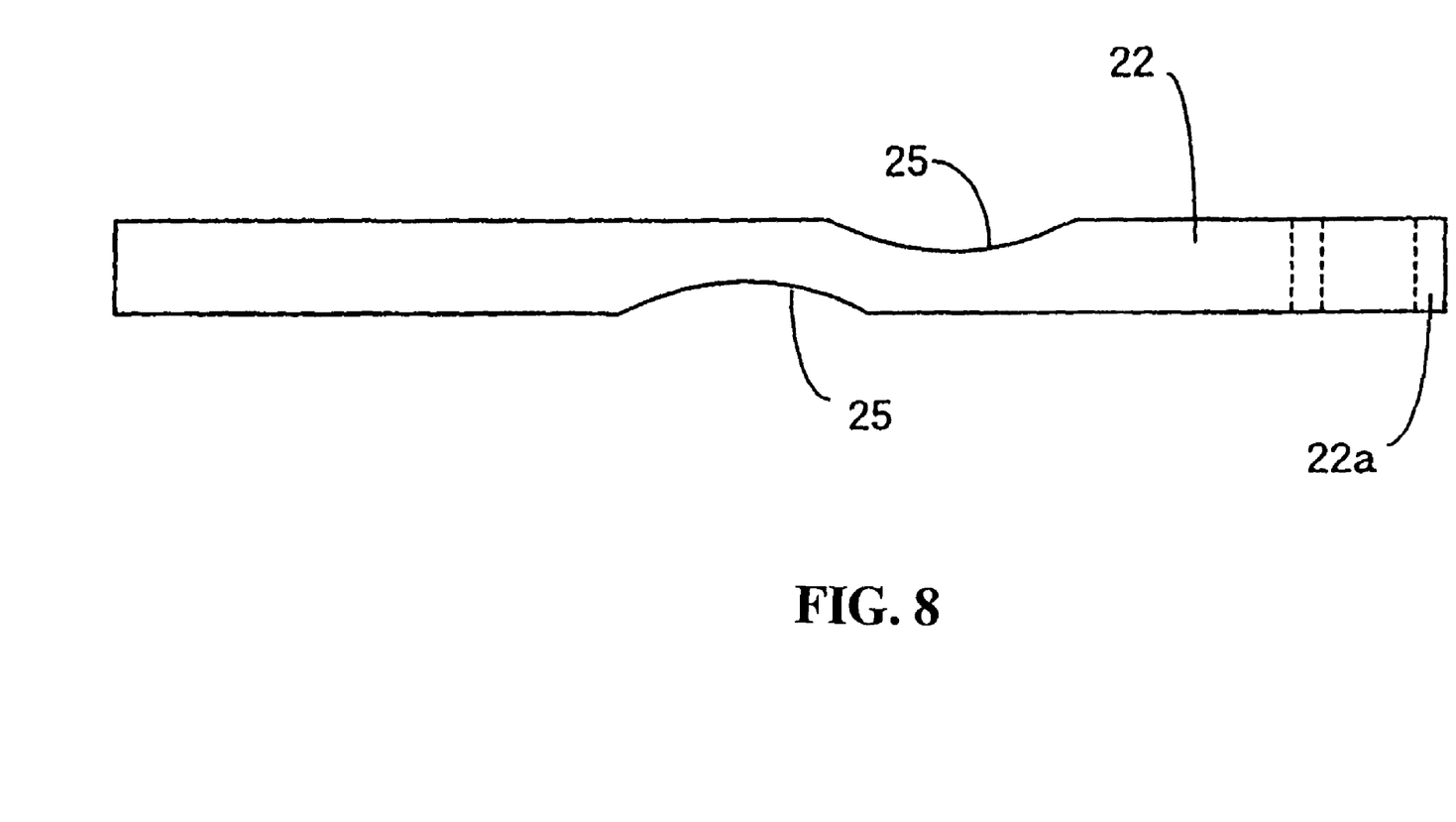
FIG. 8 is a plan showing a tensioner arm body in the tensioner arm.
Figure 9:
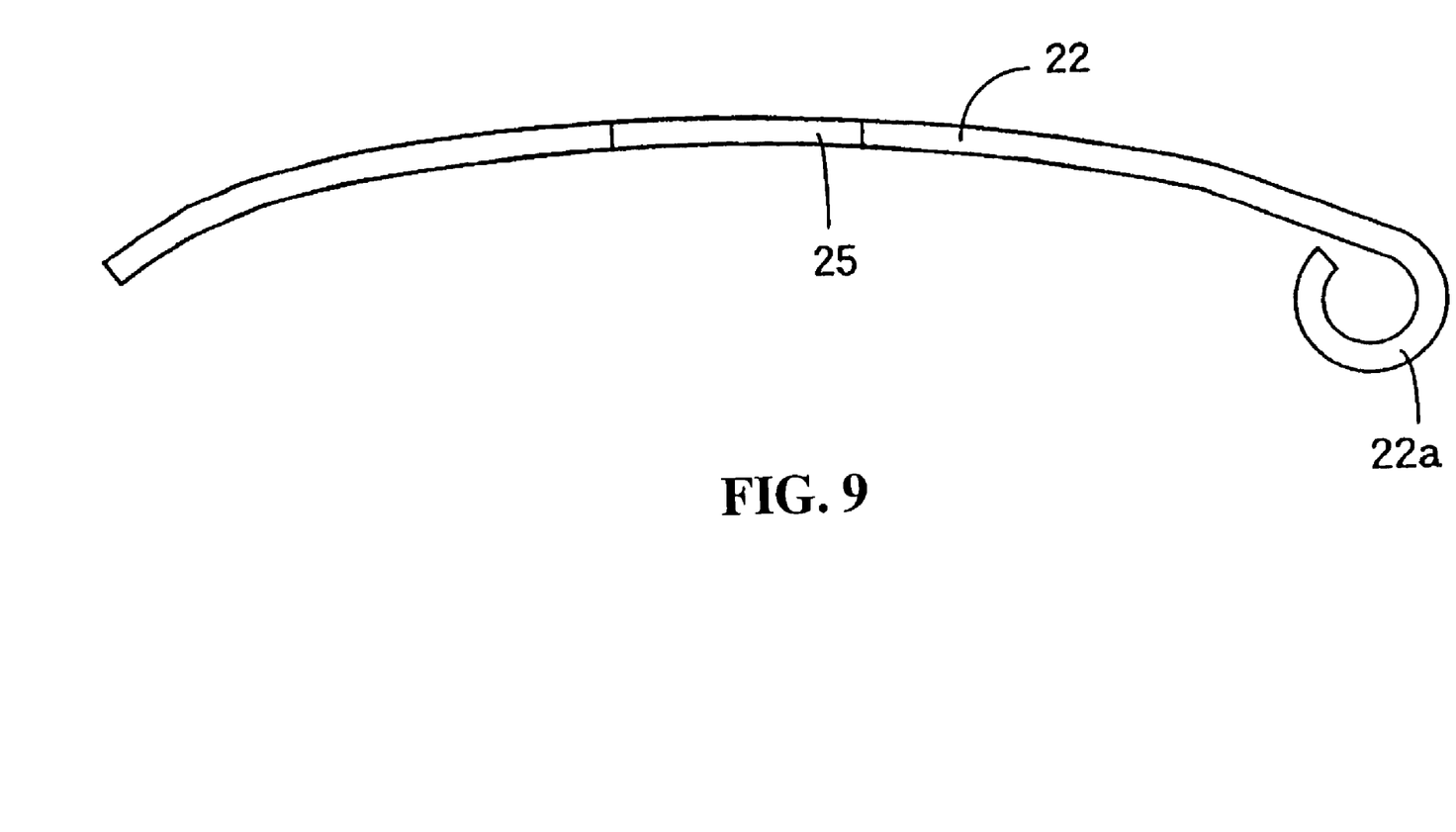
FIG. 9 is a side view showing the tensioner arm body.

As shown in FIGS. 8 and 9, an arc-shaped cut-out 25 is formed in the middle from the first pivot 20 to a point N pressed by the control arm 17 on both sides of the tensioner arm body 22. Thereby, the width in the middle of the tensioner arm body 22 is set so that it is smaller than the width at both ends of the arm body 22.

As shown in FIG. 1 again, the control arm 17 is made of a spring steel plate like the tensioner arm body 22 and is supported in the vicinity of the first driven sprocket 12 via a second pivot 21 by the cylinder head 3 so that the control arm can be oscillated with the oscillated end being engaged with the back on the side of the oscillated end of the tensioner arm body 22. A pressure plate 27 is bonded to the back in the middle of the control arm 17 via cushion material 26 such as rubber and the tensioner lifter 18 for pressing the pressure plate 27 on the side of the tensioner arm 16 is attached to the cylinder head 3.

A point P of the application of the pressure of the tensioner lifter 18 upon the control arm 17 is set in the middle of the center O of the second pivot 21 which is the center of the oscillation of the control arm 17 and the pressure point N of the control arm 17 upon the tensioner arm 16.

The control arm 17 is provided with an auxiliary shoe 28 made of synthetic resin and slidingly engaged with the outside of the transmission chain 14 between the first driven sprocket 12 and the end of the tensioner arm 16.

The tensioner lifter 18 is composed of a lifter case 29 fixed to the cylinder head 3, a hollow lifter rod 30 is supported by the lifter case 29 so that the rod cannot be turned and is opposite to the pressure plate 2. A screw shaft 31 is screwed to a hollow part of the lifter rod 30 and a twisted coil spring 32, for turning and pressing the screw shaft 31 in a traveling direction of the lifter rod 30, is provided in the lifter case 29 as is heretofore well-known. Therefore, the torsional moment of the twisted coil spring 32 is converted to a thrust load by the screw shaft 31 and is amplified to be pressure that presses the lifter rod 30 on the side of the control arm 17.

Next, the action of the embodiment will be described.

While the timing transmission gear 10 is operated, that is, when the driving sprocket 11 drives the first and second driven sprockets 12, 13 via the transmission chain 14, the engaged state of each sprocket 11 to 13 of the transmission chain 14 is always kept suitable and efficient chain transmission is achieved by transmitting pressure which the tensioner lifter 18 applies to the pressure plate 27 of the control arm 17 by the lifter rod 30 to the tensioner arm 16 via the control arm 17, transmitting it to the loose side of the transmission chain 14 and applying fixed tension to the transmission chain 14.

In case the transmission chain 14 is oscillated, the oscillation can be absorbed by the pressure of the tensioner lifter 18 and the suitable deflection of the control arm 17 and the tensioner arm 16. More particularly, as the control arm 17 is inserted between the transmission chain 14 and the tensioner arm 16, the repulsion of the transmission chain 14 to the tensioner arm 16 is transmitted to the tensioner lifter 18 after the repulsion is buffered by the suitable deflection of the control arm 17, a load of the tensioner lifter 18 is reduced, the tensioner lifter 18 can suitably fulfill an oscillation inhibiting function for the transmission chain 14 and the useful life can be extended.

In addition, as the point P of the application of the pressure of the tensioner lifter 18 upon the control arm 17 is set in the middle of the center O of the oscillation of the control arm 17 and the point N at which the tensioner arm 16 is pressed by the control arm 17, the tensioner arm 16 can be greatly moved via the control arm 17 at a relatively small stroke of the lifter rod 30 of the tensioner lifter 18 owing to the arm ratio of the control arm 17. As a result, the follow-up of the lifter rod 30 for the extension of the transmission chain 14 is enhanced, the tensioner lifter 18 can more suitably fulfill the oscillation inhibiting function for the transmission chain 14 in cooperation with a fact that the repulsion of the transmission chain 14 is not directly transmitted to the tensioner lifter 18 and the life can be further extended.

Further, as the control arm 17 presses the auxiliary shoe 28 upon the outside of the transmission chain 14 between the first driven sprocket 12 and the tensioner arm 16 by the pressure of the tensioner lifter 18, the contact ratio between the transmission chain 14 and the first driven sprocket 12 is enhanced and the control arm contributes to the enhancement of chain transmission efficiency.

As the tensioner arm 16 is composed of the tensioner arm body 22 made of a spring steel plate and the flexible tensioner shoe 23 made of synthetic resin that covers the front of the tensioner arm body 22 and is directly slidingly engaged with the transmission chain 14 and the arc-shaped cut-out 25 the width of which is smaller than the width of each end is provided on both sides of the middle of the tensioner arm body 22, the flexibility in the middle of the tensioner arm body 22 is enhanced, the oscillation absorption function for the transmission chain 14 can be enhanced, the natural frequency of the tensioner arm body 22 is different in each part because the width of the tensioner arm body 22 is different in each part and the tensioner arm can also contribute to the prevention of the resonance of the tensioner arm body 22.

In addition, as the width of the chain guide groove 23b of the tensioner shoe 23 to which the transmission chain 14 is fitted is fixed overall though surface pressure between the tensioner arm body 22 and the tensioner shoe 23 is large in a location in which the width of the tensioner arm body 22 is small, surface pressure between the tensioner shoe 23 and the transmission chain 14 is not particularly large, the wear resistance of the tensioner shoe 23 is not damaged and the durability of the tensioner arm 17 can be secured.

Further, desired flexibility can be simply applied to the middle of the tensioner arm body 22 by selecting the depth and the number of the cut-outs 25.

Figure 10:
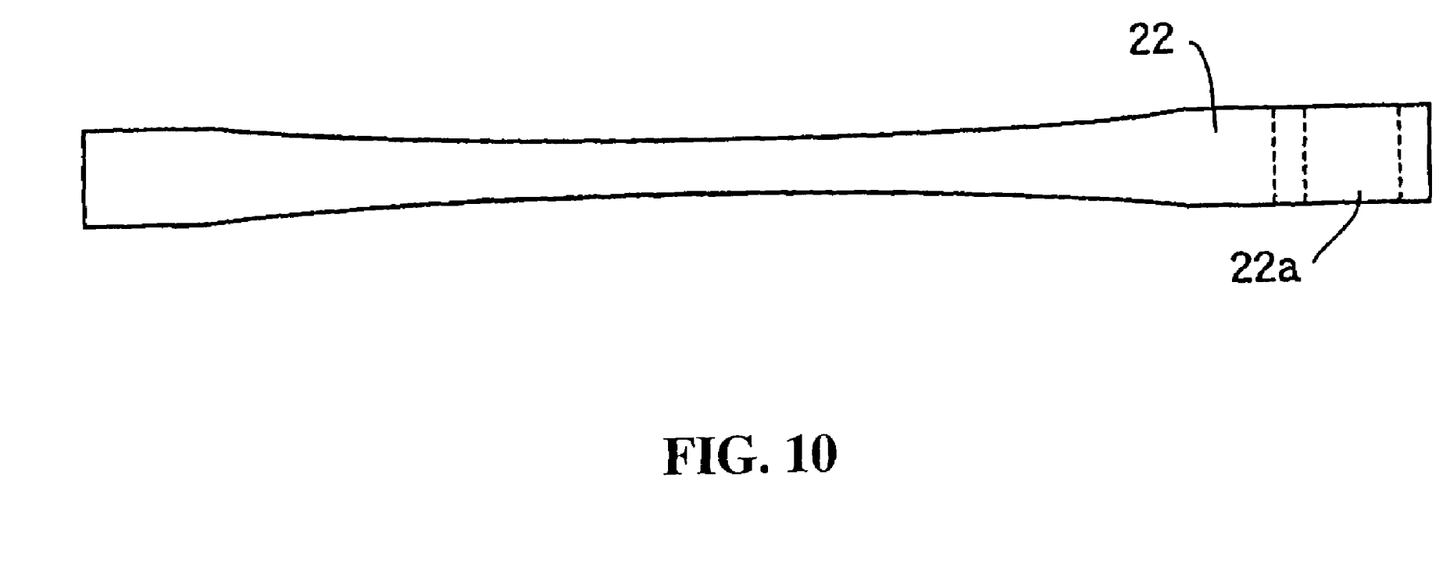
FIG. 10 shows another embodiment of the invention and corresponds to FIG. 8.

Another embodiment shown in FIG. 10 of the present invention includes the width of a tensioner arm body 22 that is gradually reduced from both ends of the arm body 22 toward the center. The configuration of the other embodiments is similar to that in the above-mentioned embodiment. Thus, the same reference numbers are allocated to a part corresponding to that in the previous embodiment in FIG. 10 and the description is omitted. In this embodiment, the similar action and effect to those in the previous embodiment can be also achieved.

Figure 11:
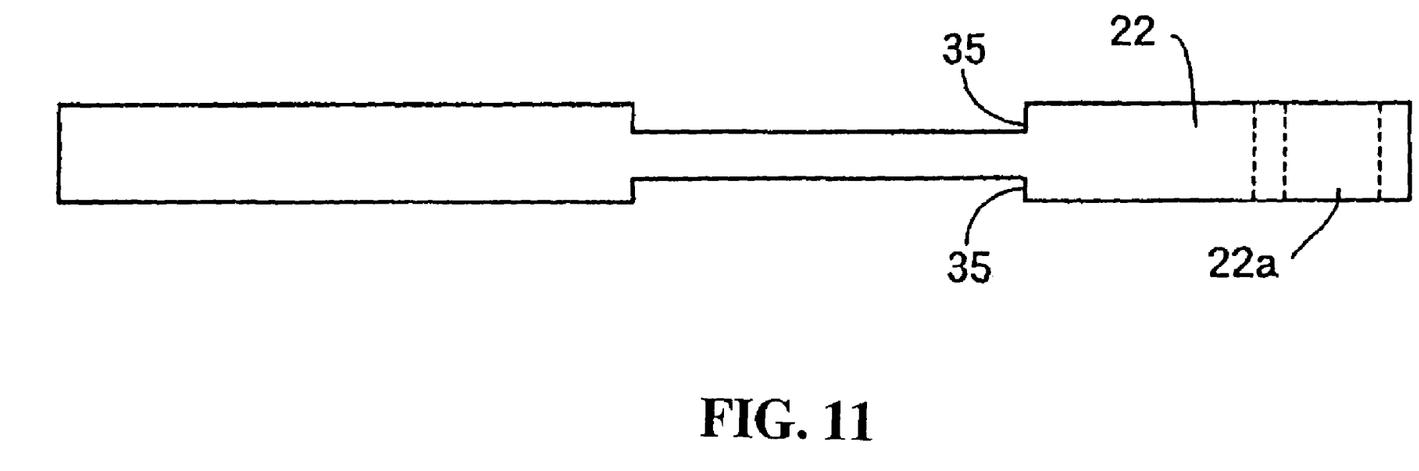
FIG. 11 shows a further embodiment of the invention and corresponds to FIG. 8.

Further another embodiment shown in FIG. 11 of the invention includes a U-shaped cut-out 25 is formed on both sides of the middle of a tensioner arm body 22 and the width of the middle is smaller than that of the other part. The configuration of the other parts is similar to that in the first embodiment with the same reference number being allocated to a part in FIG. 11 corresponding to that in the first embodiment and the description is omitted. In this embodiment, the similar action and effect to those in the first embodiment can be also achieved.

Figure 12:
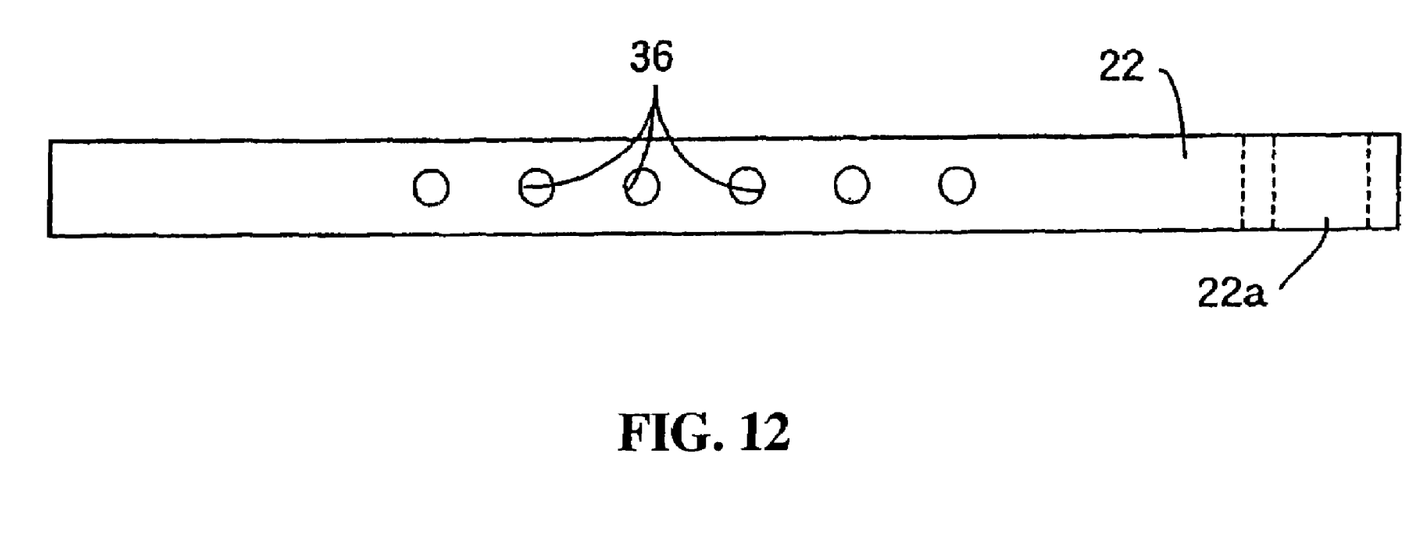
FIG. 12 shows another embodiment of the invention and corresponds to FIG. 8.

Furthermore another embodiment shown in FIG. 12 of the present invention is characterized in that plural circular holes 36 are made in the longitudinal direction of a tensioner arm body 22 in the middle of the tensioner arm body 22 to enhance the flexibility of the middle. The configuration of the other parts is similar to that in the first embodiment with the same reference number being allocated to a part shown in FIG. 12 corresponding to that in the first embodiment and the description is omitted. In this embodiment, the similar action and effect to those in the first embodiment can be also achieved.

Besides, desired flexibility can be simply applied to the middle of the tensioner arm body by selecting the shape (for example, a long hole) and the number of the holes 36.

The present invention is not limited to the above-mentioned embodiments and various design changes are possible in a range which does not deviate from the object of the present invention. For example, the pressure of the tensioner lifter 18 may be also to directly act upon the back at the end of the tensioner arm 16 without using the control arm 17.

As described above, according to a first characteristic of the present invention, in the chain tensioner provided with the tensioner arm relatively slidably engaged with the outside on the loose side of the transmission chain without an end rockably supported by the fixed structure and coupling the driving sprocket and the driven sprockets and the tensioner lifter supported by the fixed structure for pressing the end of the tensioner arm upon the side of the transmission chain. The tensioner arm is composed of the elastic band tensioner arm body curved toward the transmission chain and the flexible tensioner shoe covering the front of the tensioner arm body and having the chain guide groove to the front of which the transmission chain is slidably fitted so that the transmission chain can be slid and the width of the middle in the longitudinal direction of the tensioner arm body is set so that the width is smaller than the width of each end of the arm body. Thus, the flexibility of the middle of the tensioner arm body is enhanced, the oscillation absorption function for the transmission chain can be enhanced, the natural frequency of the tensioner arm body is different in each part because the width of the tensioner arm body is different in each part and the resonance of the tensioner arm body can be also prevented. In addition, in a location in which the width of the tensioner arm body is small, surface pressure between the tensioner shoe and the transmission chain is not particularly high because the tensioner shoe is provided with the chain guide groove to which the transmission chain is fitted though surface pressure between the tensioner arm body and the tensioner shoe that is large and the durability of the tensioner arm can be secured without damaging the wear resistance of the tensioner shoe.

Besides, according to a second embodiment of the present invention, as the arc-shaped cut-out is formed on both sides of the middle to set the width of the middle of the tensioner arm body to a smaller value, the desired flexibility can be simply applied to the middle of the tensioner arm body by selecting the depth and the number of cut-outs.

Further, according to another embodiment of the present invention, in the chain tensioner provided with the tensioner arm rockably supported by the fixed structure and relatively slidably engaged with the outside on the loose side of the transmission chain without an end coupling the driving sprocket and the driven sprockets and the tensioner lifter supported by the fixed structure for pressing the end of the tensioner arm on the side of the transmission chain. The tensioner arm is composed of the elastic band tensioner arm body curved toward the transmission chain and the flexible tensioner shoe covering the front of the tensioner arm body and having the chain guide groove to the front of which the transmission chain is slidably fitted and the hole is made in the middle in the longitudinal direction of the tensioner arm body. Thus, the flexibility of the middle of the tensioner arm body is enhanced, the oscillation absorption function for the transmission chain can be enhanced, the natural frequency is different between a part having the hole and a part without the hole in the tensioner arm body and the resonance of the tensioner arm body can be also prevented. In addition, in the periphery of the hole of the tensioner arm body, surface pressure between the tensioner shoe and the transmission chain is not particularly large because the tensioner shoe is provided with the chain guide groove to which the transmission chain is fitted though surface pressure between the tensioner arm body and the tensioner shoe which is large and the durability of the tensioner arm can be secured without damaging the wear resistance of the tensioner shoe. Besides, desired flexibility can be simply applied to the middle of the tensioner arm body by selecting the shape and the number of the holes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A chain tensioner provided with a tensioner arm relatively slidably engaged with an outside on a loose side of a transmission chain with an end rockably supported by a fixed structure and coupling a driving sprocket and a driven sprocket and a tensioner lifter supported by a fixed structure for pressing an end of the tensioner arm on the loose side of the transmission chain, wherein the tensioner arm comprises:
    an elastic band tensioner arm body curved toward the transmission chain, the tensioner arm body being made of a spring steel plate; and
    a flexible tensioner shoe for covering a front of the tensioner arm body and having a chain guide groove to the front wherein the transmission chain is slidably fitted; and
    a width of a middle in the longitudinal direction of the tensioner arm body is set to a smaller value relative to a width of each end of the tensioner arm body so that a natural oscillation frequency in the middle of the tensioner arm body is different from the natural oscillation frequency at each of the ends of the tensioner arm body, thereby preventing resonance of the tensioner arm body.

2. The chain tensioner according to claim 1, wherein an arc-shaped cut-out is formed on both sides of the middle to set the width of the middle of the tensioner arm body to a small value.

3. The chain tensioner according to claim 1, wherein cut-outs are provided in said tensioner arm body that are staggered to be not in alignment on each side of said tensioner arm body.

4. The chain tensioner according to claim 1, wherein cut-outs are provided in said tensioner arm body that are alignment relative to each other on each side of said tensioner arm body.

5. The chain tensioner according to claim 1, wherein gradually reduced areas are provided in said tensioner arm body that are alignment relative to each other on each side of said tensioner arm body.

6. The chain tensioner according to claim 1, wherein said tensioner arm extends for a predetermined distance in engagement with the loose side of said transmission chain for enhancing the oscillation absorption function of the transmission chain.

7. The chain tensioner according to claim 1, and further including a control arm for engaging the tensioner arm for applying pressure from the tensioner lifter to the tensioner arm.

8. The chain tensioner according to claim 7, wherein said control arm is a spring plate for applying a biasing force to the tensioner arm.

9. A chain tensioner provided with a tensioner arm rockably supported by a fixed structure and relatively slidably engaged with an outside on a loose side of a transmission chain coupling a driving sprocket and a driven sprocket and a tensioner lifter supported by a fixed structure for pressing the end of the tensioner arm upon the loose side of the transmission chain, wherein the tensioner arm comprises:
    an elastic band tensioner arm body curved toward the transmission chain, the tensioner arm body being made of a spring steel plate; and
    a flexible tensioner shoe for covering a front of the tensioner arm body and being provided with a chain guide groove to a front wherein the transmission chain is slidably fitted; and
    at least one hole formed in a middle in the longitudinal direction of the tensioner arm body so that a natural oscillation frequency in the middle of the tensioner arm body is different from the natural oscillation frequency at each end of the tensioner arm body, thereby preventing resonance of the tensioner arm body.

10. The chain tensioner according to claim 9, wherein said tensioner arm extends for a predetermined distance in engagement with the loose side of said transmission chain for enhancing the oscillation absorption function of the transmission chain.

11. The chain tensioner according to claim 9, and further including a control arm for engaging the tensioner arm for applying pressure from the tensioner lifter to the tensioner arm.

12. The chain tensioner according to claim 11, wherein said control arm is a spring plate for applying a biasing force to retain engagement with the tensioner arm.

13. A chain tensioner comprising:
a tensioner arm relatively slidably engaged with a loose side of a transmission member for coupling a driving sprocket and a driven sprocket; and
a tensioner lifter for pressing an end of the tensioner arm on the side of the transmission member;
said tensioner arm comprising:
an elastic band tensioner arm body curved toward the transmission member, the tensioner arm body being made of a spring steel plate; and
a flexible tensioner shoe for covering a front of the tensioner arm body and having a guide groove wherein the transmission member is slidably fitted; and
wherein a central portion in the longitudinal direction of the tensioner arm body has a smaller width relative to the width of each end of the arm body so that a natural oscillation frequency in the central portion of the tensioner arm body is different from the natural oscillation frequency at each of the ends of the tensioner arm body, thereby preventing resonance of the tensioner arm body.

14. The chain tensioner according to claim 13, wherein an arc-shaped cut-out is formed on both sides of the center to form the center of the tensioner arm body with a smaller width.

15. The chain tensioner according to claim 13, wherein cut-outs are provided in said tensioner arm body that are staggered to be not in alignment on each side of said tensioner arm body.

16. The chain tensioner according to claim 13, wherein cut-outs are provided in said tensioner arm body that are alignment relative to each other on each side of said tensioner arm body.

17. The chain tensioner according to claim 13, wherein gradually reduced areas are provided in said tensioner arm body that are alignment relative to each other on each side of said tensioner arm body.

18. The chain tensioner according to claim 13, wherein said tensioner arm extends for a predetermined distance in engagement with the loose side of said transmission member for enhancing the oscillation absorption function of the transmission member.

19. The chain tensioner according to claim 13, and further including a control arm for engaging the tensioner arm for applying pressure thereto.

20. The chain tensioner according to claim 19, wherein said control arm is a spring plate for biasing the tensioner arm.

* * * * *